Dec. 7, 1954     L. O. MYERS     2,696,406
HOSE REEL

Filed May 28, 1951

INVENTOR
LEON O. MYERS
BY
*Joseph B. Gardner*
ATTORNEY

United States Patent Office 2,696,406
Patented Dec. 7, 1954

2,696,406

HOSE REEL

Leon O. Myers, Oakland, Calif., assignor to L. O. Myers Corporation, Sacramento, Calif., a corporation of California Application May 28, 1951, Serial No. 228,649

4 Claims. (Cl. 299—78)

This invention relates to hose reels and is particularly directed to hose reels of a type which may be rotated to wind in or pay out a hose maintained in uninterrupted flow communication with a fluid conduit.

Storage of hose, as for example, garden hose has always presented somewhat of a problem and particularly if the hose is permanently attached to a water outlet or other fluid supply system. Hose, loosely piled on the ground surface, not only presents an extremely unsightly appearance but presents a hazard, and hose so disposed is subject to damage from heavy objects falling thereon and from exposure to sunlight and rotting caused by contact with the ground.

Storage devices in common usage are cumbersome, unsightly, and not easily adapted for convenient and compact mounting, or to provide a spooling function which may be easily manipulated while the hose is maintained in full operation attachment with the fluid outlet.

An object of the present invention is to provide a hose reeling device which employs the projecting end of a fluid conduit as a mounting support therefor.

Another object of the invention is to provide a hose reel supported on a fluid conduit by a bearing disposed substantially centrally and coaxially therewith whereby the reel may be located in close proximity to the wall of a building or other structure and whereby bearing stress is substantially reduced.

A further object of my invention is to provide a hose reeling device which is simple, inexpensive and compact in construction and which is so designed as to permit free access to the fluid conduit upon which the device is supported and also the various internal parts of the mechanism.

A still further object of this invention is to provide a hose reeling device of the character described with which a protective cover for the hose may be utilized without interference of the normal functioning of the apparatus.

Yet another object of the invention is to provide a unitary hose reeling device adapted to be rotatably mounted upon the protruding end of a fluid conduit, including therein means for guiding the hose as it is spooled thereon and valve means for controlling fluid flow therethrough disposed in such a fashion that the control handle thereof is readily accessible but does not project or extend therefrom in an obtrusive manner.

The invention possesses other objects and features of advantage, some of which, with the foregoing, will be set forth in the preferred form of the invention which is illustrated in the drawing accompanying and forming part of the specification. It is to be understood, however, that variations in the showing made by the said drawing and description may be adopted within the scope of the invention as set forth in the claims.

Referring to the drawing.

Figure 1:
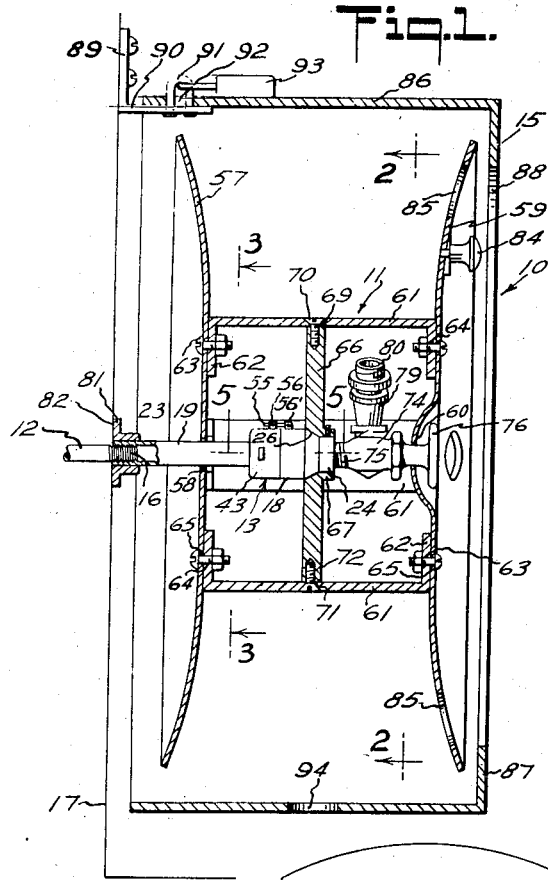
Figure 1 is a side elevational view, partly in section, of a hose reel shown as operatively installed on a fluid or similar conduit in accordance with my invention.
Figure 3:
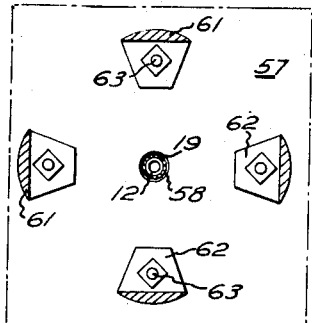
Figure 3 is a view taken along the plane indicated by lines 3—3 of Figure 1.
Figure 4:
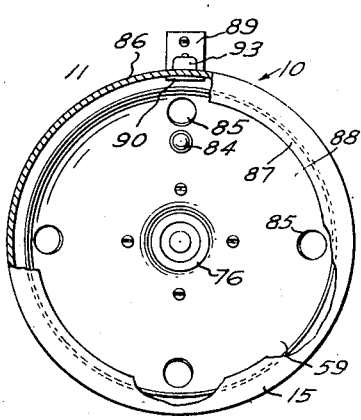
Figure 4 is an end view of the apparatus illustrated in Figure 1, portions of the cover being broken away to more clearly reveal internal constructional details of the device.

As may best be seen by reference to Figure 1 of the drawing, the hose reel apparatus 10 of my invention comprises, in general, a reel assembly 11 rotatably supported upon a generally horizontally disposed fluid conduit 12 by swiveled coupling means such as the particular coupling 13 illustrated therein through which coupling 13 flow communication between said conduit 12 and a hose (not shown) disposed upon said reel 11 may be established and maintained, which apparatus 10 also includes a fitted cover 15 enclosing and sheltering reel assembly 11.

More particularly, any fluid conduit which is relatively rigidly supported and is disposed in a generally horizontal position as, for example, an outside water outlet including such a fluid conduit 12 secured within a building structure with a threaded end portion 16 thereof projecting without a building wall surface 17 is adaptable to the installation of the hose reel apparatus 10 thereon.

Figures 2, 5:
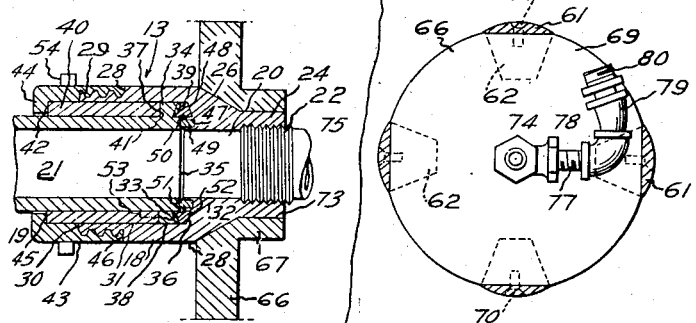
Figure 2 is a view taken along the plane indicated by the lines 2—2 of Figure 1.
Figure 5 is a cross-sectional view illustrating details of a swivel coupling and supporting means whereby the hose reel apparatus of Figure 1 is mounted on the fluid conduit and whereby the hose carried by the hose reel is maintained in uninterrupted flow communication with the fluid conduit.

Preferably the swivel coupling 13 employed for rotatably supporting the reel assembly 11 upon the fluid conduit 12 is of the type illustrated in detail in Figure 5 and as disclosed in my copending application Serial No. 197,791, filed November 27, 1950, as such coupling is particularly well adapted to perform the required functions. It will become apparent as the description proceeds that other swivel type couplings and similar devices capable of performing the required function may be substituted for the particular type illustrated without, however, departing from the spirit and teachings of the invention.

With particular reference to Figure 5, such swivel coupling 13 may be seen to include a body 18 and a coupling member 19 joined in axial alignment and in a fluid tight manner so as to be radially rotatable with respect to each other as is fully described hereinafter. Said body 18 and coupling 19 include axial bores 20 and 21 respectively formed therein thereby providing a straight continuous fluid path traversing the coupling 13. The distal portions of the bores 20 and 21 are provided in the wall portions thereof with threads 22 and 23, respectively, said threads 23 being adapted to receive the threaded end portion 16 of the fluid conduit 12 and said threads 22 may be employed to connect the hose 14 as will be more fully described hereinafter.

Further, the outer surface of the body 18, in the distal region thereof, is formed with a cylindrical section 24 joining with a radially outwardly inclined section 26 of somewhat larger diameter than section 24, thence being slightly and abruptly constricted forming the shoulder 28 with the threaded portion 29 extending outwardly therefrom and terminating in the proximal flat end surface 30.

Somewhat inwardly from the threads 22, the axial bore 20 of the body 18 is abruptly widened to provide a wider bore portion 31 separated from the narrower portion 32 thereof by a shoulder region 33 and thereby to receive the proximal end portion of the coupling 19. The outer surface of the coupling 19 is of a generally cylindrical configuration however being provided with a ring lug member 34 extending outwardly from an encircling said outer surface at a location spaced slightly from the proximal end surface 35 thereof thereby allowing an outer surface portion 36 to remain between said member 34 and end surface 35. Further, the ring lug member 34 is formed with the distal shoulder 37, a peripheral cylindrical surface 38 which slidably contacts the surfaces of the wider bore portion 31 and a proximal undercut shoulder 39.

To retain the coupling 19 and body 18 in operative assembly there is provided an annular ring bearing force member 40 formed of sinter bronze or similar bearing material and adapted to slide along the outer surface of the coupling 19 within the wider bore portion 31 whereby the proximal end surface 41 bears against the distal shoulder 37 of the lug member 34 and the distal end surface 42 projects beyond the terminal end surface of the body 18. A lock nut 43 is employed to exert a tensioning pressure upon the force member 40 to strongly join the body 18 and coupling 19. More particularly the generally cylindrical lock nut 43 is constructed with an inner threaded portion which engages the threaded portion 29 of the body 18 and an inwardly inclined distally situated lug portion 44 having a proximal shoulder surface 45 bearing upon the distal end surface 42 of the force member 40 and terminal end surface of body 18 and a proximally situated terminal end surface 46 which bears upon the shoulder 28 of the body 18.

Additional bearing means and an especially adapted sealing means is also provided between the body and coupling. More particularly, the shoulder region 33 situated between the narrower and wider portion 31 of the body bore 20 is constructed with a first rectangular groove 47 adjacent to the narrower portion of the bore 20 and a second groove situated between said groove 47 and the walls of the wider bore 31 the bottom 48 of which groove forms a radially inwardly inclined proximal shoulder surface of the body 18. An annular bearing ring 49 formed of sinter bronze or the like is positioned in the groove 47 and extends outwardly therefrom so that a rounded edge surface 50 thereof engages the surfaces of a semicircular groove 51 formed in the proximal end surface 35 of the coupling 19 serving at once as a seal and a bearing. As may be noted the groove 47, walls of the wider bore portion 31, proximal undercut shoulder 39 of the lug 34 and outer surface portion 36 of the coupling 19 define a generally trapezoidal cavity the larger bore surface of which is inwardly disposed and which cavity is adapted to receive the sealing gasket 52 formed of gasketing material and with a thin adherent surface covering 53 of bronze or similar bearing material which slidably contacts the surface of undercut shoulder 39. Thereby there is completed a swivel coupling the body of which may be rotated with respect to the coupling portion thereof while the juncture of the body and coupling are maintained fluid tight and which coupling is capable of withstanding a considerable torque across the juncture. Thus such coupling is adapted to the purposes for which it is employed in my hose reel device.

To facilitate assembly of the coupling diametrically opposed lugs 54 projecting from the external surface of the lock nut 43 may be provided as may, also, a fastening means designed to assure retention of the lock nut in assembled position. Such fastening means may comprise a bar 55 pivoted between a pair of ears 56 disposed upon the external surface of the lock nut 43 so as to swing across the juncture of the locknut 43 and body 18 between a pair of spaced ears 56' situated upon the cylindrical section 26 of the outer body surface whereby the bar 55 may be pinned thereto.

The reel assembly 11 may be constructed as of a first dished circular end plate 57 having a central opening 58 formed therein and a second dished circular end plate 59 having a central opening 60 formed therein supported in parallel spaced relationship from said first circular plate 57 with the convex surfaces thereof in proximal relation by a number of crosspiece slats 61 disposed therebetween parallel to and radially equidistant from the central axis of the plates 57 and 59 with the radial distance to said slats 61 being considerably less than the radius of the circular plates thereby allowing sufficient space for the hose to be wound thereon. Also the slats 61 may be spaced sufficiently from each other to allow limited access to the interior of the reel assembly.

Preferably the slats 61 are attached by tabs 62 extending inwardly from each end of the slats 61 to the plates 57 and 59 by machine bolts 63 passing through holes 64 formed in the tabs 62 and holes 65 formed in the end plates. These modes of attachment allow rapid assembly and demounting for ready access to the interior.

Such assembly 11 is most advantageously supported upon the swivel coupling 13 by providing therein a disklike supporting element 66 with the hub portion 67 thereof axially aligned with the openings 58 and 60 of the end plates 57 and 59, respectively, and with the peripheral surface 69 thereof disposed immediately adjacent the inner surfaces of the slats 61 about midway of the length thereof and being secured to the latter preferably by machine screws 70 passing through holes 71 formed in the slats 61 and engaging threaded holes 72 extending inwardly of the end portions of the element 66 from the peripheral surface thereof. The central opening 73 in hub portion 67 is formed with a configuration corresponding to that of the exterior surface of the body 18 in the region of the cylindrical section 24 and radially outwardly inclined portion 25 whereby such hub portion 67 may be pressed thereon and thereby the hub portion 67 is rigidly affixed to the body 18. Other means which accomplish such a rigid mounting may also be employed.

Accordingly, when the wheel assembly 11 and swivel coupling 13 are assembled the coupling member 19 of the coupling projects through the central opening 58 formed in the end plate 57 in proper position to receive the threaded end portion 16 of the fluid conduit 12 and a right angle valve 74 or faucet may be attached to the body 18 of the swivel coupling 13 by engaging the threaded nipple portion 75 thereof with the threads 22 of the body bore 20 whereby the control wheel handle 76 of the valve 74 projects through the opening 60 formed in end plate 59 in order that it may be manipulated to open and close the valve but not to such an extent that it protrudes obtrusively beyond the peripheral edge of the end plate 59.

In order to facilitate attachment of the hose 14 (not shown) pipe fittings may be provided as for example a short nipple 77, right angle L 78 and a strict L 79 connected in series and with said short nipple connected with the exit opening of the valve 74 terminating in a hose adaptor nipple 80 installed in the internal threaded portion of the strict L 79 and near one of the openings existent between adjacent slats 61.

For mounting purposes, the coupling 19 of the swivel coupling 13 may be made in any convenient length as the projecting portion of the fluid conduit 12 may be cut or extended to a length sufficient to compensate for a shorter coupling length. However the arrangement illustrated in Figure 1 is preferred for practical reasons.

As shown therein the coupling 19 is extended to a position slightly beyond the outer peripheral edge of the end plate 57 and the end portion thereof is preferably provided with a reinforcing flange 81 encircling and extending radially outwardly therefrom whereby the end face 82 thereof, which is substantially coplanar with the proximal end 83 of the coupling 19, abuts against the wall surface 17 when the coupling 19 is attached to the projecting end portion of the fluid conduit 12 and thereby said flange 81 serves to relieve bearing stresses on the fluid conduit end portion and the coupling 19.

On the exterior surface of the outer end plate 59 there may be provided a swiveled knob 84 whereby the reel assembly 11 may be rotated to reel in or pay out hose 14 disposed thereon and the outer end plate 59 may also be provided with perforations 85 near the outer periphery thereof into which the nozzle on the hose may be thrust so as to secure the hose upon the reel.

The fitted cover 15 may be constructed as a cylindrical section 86 of thin gauge metal with a lip 87 projecting inwardly leaving a central end opening 88 therein through which the swiveled knob 84 and control wheel handle of the valve 74 may be manipulated when the cover 15 is fitted over the reel assembly 11 with the lip 87 approaching the outer periphery of the outer end plate 59. Such fitted cover 15 may be supported as by an angle bracket 89 secured to the wall surface 17 in a position above the conduit 12 with a lip portion 90 projecting outwardly from the wall surface 17 and bearing an upwardly projecting staple loop 91 which is adapted to pass through a slot 92 provided in the cylindrical section 86 of the cover and which loop 91 may be engaged by a padlock 93 if desired. If slot 94 or other perforation is provided in the lower portion of the cylindrical section 86 the hose 14 may be wound or payed off the reel with the fitted cover in place.

Maintenance and installation of the reel assembly is most conveniently afforded as the particular construction employed in my hose reel allows easy removal of the slats or end plates for ready access to the interior.

I claim:

1. A hose reel comprising a reel assembly constructed of a pair of centrally perforated end plates supported in spaced relationship by slat crosspieces disposed therebetween and releasably attached thereto thereby defining a generally cylindrical cavity therein, swivel coupling means including a body and coupling portions having an axial bore for fluid passage therein and disposed coaxially within said cylindrical cavity such being radially rotatable in a fluid tight manner with respect to each other with the coupling bore portion being adapted to receive the projecting end of a fluid conduit and projecting without the central opening in one of said end plates, supporting means including a generally disk-shaped member disposed medially of and parallel to said end plates engaging said body portion of the swivel coupling and extending outwardly therefrom to engage the said slats whereby the reel assembly is supported by said swivel coupling, and a central valve engaging said body bore portion carrying means for the attachment of a hose, and said valve having a manually engageable actuating portion which projects through the central opening in the second of said end plates.

2. The device as defined in claim 1 wherein said end plates are of a circular and dished form and disposed with the concave faces outward and wherein said second plate is provided with handle means whereby said reel assembly may be rotated.

3. A hose reel including a reel assembly constructed of a pair of dished circular plates having central openings formed therein which plates are supported with the convex faces thereof facing outwardly in parallel spaced relation by a series of crosspiece slats disposed therebetween and attached thereto thereby defining a generally cylindrical cavity coaxially disposed with respect to said plates therein, swivel fluid coupling means having coupling and body portions relatively rotatable in fluid tight manner with respect to each other and provided with an axial bore to permit fluid passage therethrough, said coupling means being disposed within said cavity in coaxial alignment therewith, said body portion having means thereon adapted to receive a fluid control valve and fluid conduit means respectively, substantially disk-like supporting means with the hub portion thereof engaging the body portion of said coupling and with the outer peripheral portions thereof extending outwardly to engage said slats whereby said reel assembly is supported by said swivel coupling.

4. The device as defined in claim 3 wherein a fluid control valve is connected with said body bore portion with the control handle thereof projecting through one of said central openings in said plate, a manually engageable handle on said plate, and a fitted cylindrical cover enclosing said reel assembly and having an opening therein adapted to allow access to said valve control handle and said manually engageable handle.

References Cited in the file of this patent

UNITED STATES PATENTS

| Number | Name | Date |
| --- | --- | --- |
| 643,712 | Cliff | Feb. 20, 1900 |
| 962,452 | Mossberg | June 28, 1910 |
| 1,156,402 | Heim | Oct. 12, 1915 |
| 1,350,499 | Hamner | Aug. 24, 1920 |
| 1,971,165 | Parker | Aug. 21, 1934 |
| 2,063,843 | Jansen | Dec. 8, 1936 |
| 2,094,872 | Crawford | Oct. 5, 1937 |
| 2,313,557 | Krenke | Mar. 9, 1943 |
| 2,361,494 | Peter | Oct. 31, 1944 |
| 2,530,114 | Bugg | Nov. 14, 1950 |

FOREIGN PATENTS

| Number | Country | Date |
| --- | --- | --- |
| 13,347 | Great Britain | 1892 |